(No Model.)

S. FREEMAN.
FERTILIZER DISTRIBUTER.

No. 321,705. Patented July 7, 1885.

Witnesses:

Inventor:
Stephen Freeman
By Stout & Underwood
Attorneys.

UNITED STATES PATENT OFFICE.

STEPHEN FREEMAN, OF RACINE, WISCONSIN.

FERTILIZER-DISTRIBUTER.

SPECIFICATION forming part of Letters Patent No. 321,705, dated July 7, 1885.

Application filed November 19, 1884. (No model.)

*To all whom it may concern:*

Be it known that I, STEPHEN FREEMAN, of Racine, in the county of Racine, and in the State of Wisconsin, have invented certain new and useful Improvements in Fertilizer-Distributers; and I do hereby declare that the following is a full, clear, and exact description thereof.

My invention relates to improvements in fertilizer-distributers, and will be fully described hereinafter.

Figure 1:
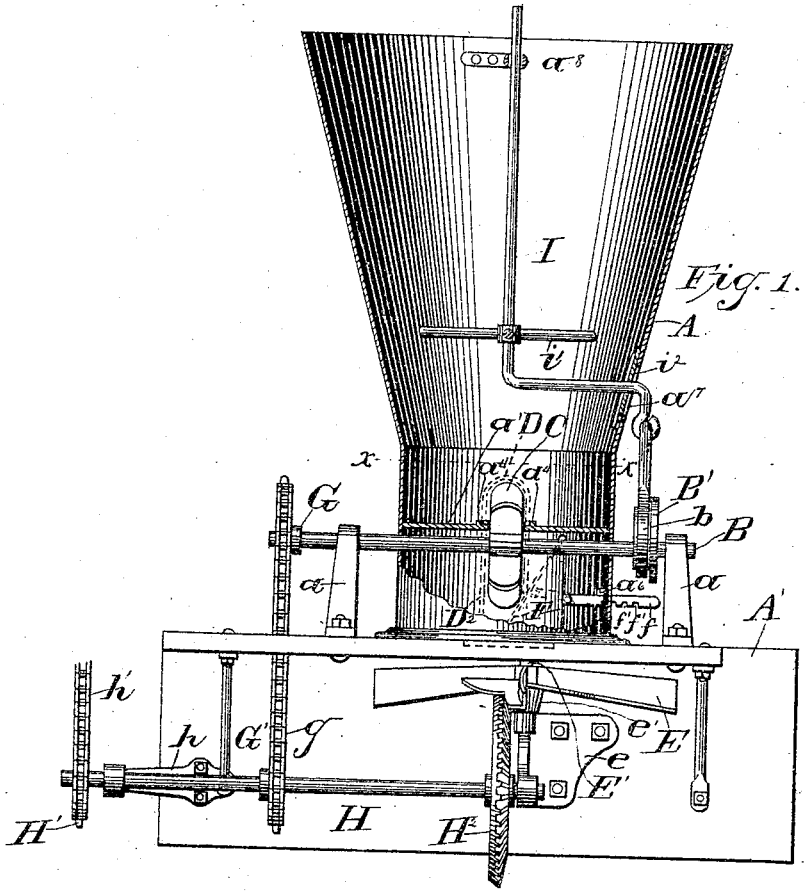
Figure 2:
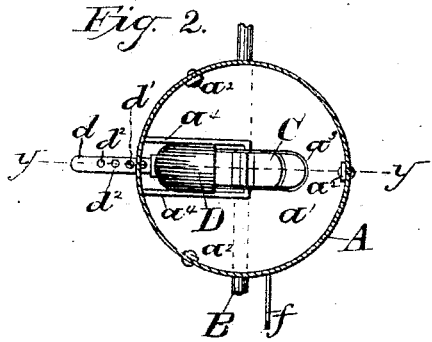
Figure 3:
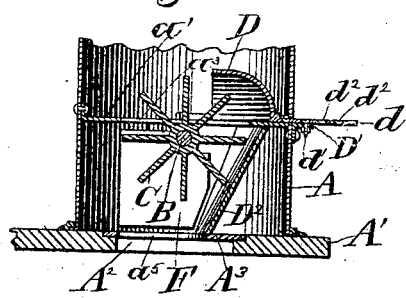

In the drawings, Figure 1 is a vertical longitudinal section through the center of the box in a machine embodying my invention. Fig. 2 is a horizontal section on line $x\,x$ of Fig. 1, and Fig. 3 is a vertical section on line $y\,y$ of Fig. 2.

A is the feed-box of my improved distributer, which is fastened in any suitable manner to the frame A'. Journaled in the bearing-brackets $a\,a$ of the frame is the shaft B, which passes through the center of the feed-box, near its bottom end, and carries therein a paddle-wheel, C. Slightly above the shaft B is the bottom $a'$, suitably supported at $a^2\,a^2$ in the periphery of the box. A slot, as shown at $a^3$, is cut in the center of this bottom, wherein the upper portion of the fan-wheel projects up freely. Running within guide-bars $a^4\,a^4$, fastened along the edges of the slot $a^3$, is a hood-shaped guard, D, provided with a stem, $d$, which is extended outward through a suitable slot in the box-side, and serves to hold the guard in position to cover more or less of the paddle-wheel, according to the quantity of the fertilizer to be distributed. A small bracket, D', fastened on the outside of the box just below and opposite the stem $d$, has a perforation to receive the bolt $d'$, which is inserted in either of the perforations $d^2\,d^2$ of the stem $d$, to fasten the guard D in the adjustment desired. Opposite the said guard D, I fasten in the under side of the bottom $a'$ the spout-shaped guard $D^2$, inclined toward the paddle-wheel and inclosing its wings, so as to prevent any of the fertilizer falling down through the hood-covered side of the slot $a^3$. Opposite this latter an opening, $A^2$, is cut into the horizontal portion of the frame A', on which the box A is supported; and in this opening is fitted the bottom piece, $A^3$, which is slotted at $a^5$, to correspond with that part of the slot $a^3$ through which the fertilizer is let out by the fan-wings. As the material leaves the slot $a^5$, it is scattered on the ground by the horizontal fan-wheel E. This latter is keyed onto the vertical shaft E', which is mounted in suitable bearings of the bracket $e$, so as to lie in a vertical plane slightly distant, but parallel to, the plane of rotation of the fan-wheel C. This disposition will cause the fertilizer to drop onto the wings of the horizontal fan-wheel E at a slight distance from its center; and to move that point farther toward the circumference of the fan, I provide an adjustable trap or slide, F, which is hinged in the under side of the bottom $a'$. This trap may be more or less inclined inward toward the lower portion of the paddle-wheel C by means of the lever $f$, hinged onto the rear face of it, and the outer end of which is projected out of the box through the slot $a^6$. By means of notches $f'\,f'$, cut in the under side of this lever, either one of which catches in the upper edge of the slot $a^6$, the trap or slide F may be held in proper adjustment. The shaft B carries a sprocket-wheel, G, that is connected through the chain-belt $g$ to the sprocket-pinion G', keyed onto the shaft H. This shaft has suitable bearings on the brackets $e$ and $h$, and carries, keyed onto its outer end, the sprocket-wheel H', which is connected through the chain-belt $h'$ to the driving-shaft of the machine. (Not shown in the drawings.) The said shaft carries also, close to its opposite end, the beveled cog-wheel $H^2$, which meshes with a beveled pinion, $e'$, keyed onto the vertical shaft E'. The shaft B has keyed onto it, close to the box A, an eccentric, B', and this is connected through a suitable stirrup or strap, $b$, to the lower end of the cranked rod I. The horizontal portion of this rod is passed through the side of the box A, in which is cut a slot, $a^7$, of a length corresponding to the motion which the rod I may receive from the eccentric B'; and in order to prevent the fertilizer from passing out of the box through the slot $a^7$, a small plate, $i^2$, is fitted to slide with the rod I on the inner face of the box as the said rod is moved up and down with its cross-rod $i'$ to agitate and press down the fertilizer onto the paddle-wheel C. The upper end of the rod I slides freely into the perforated end of the bracket $a^3$, fastened onto the inside face of the box, near its upper rim.

The sprocket-wheels G, $g'$, and H' may be variously interchanged when found desirable, to vary the quantity of material distributed beyond the measure allowed by the adjustment of the hood-shaped guard D.

Having thus described my invention, what I claim as new, and desire to secure by Letters Patent, is—

1. In a fertilizer-distributer, in combination with the box A, having the slotted bottom $a'$, a paddle-wheel mounted below said bottom and projecting up through the slot, and provided with means for regulating the flow of the fertilizer to it, and means for guiding the fertilizer from the paddle-wheel to the distributer, substantially as set forth.

2. In a fertilizer-distributer, in combination with the box A, having the slotted bottom $a'$, a paddle-wheel mounted below said bottom and projecting up through the slot, means for regulating the flow of the fertilizer to it and for guiding the same from the paddle-wheel to the distributer, and adjustable means, as herein described, to vary the throw of the latter, substantially as set forth.

3. The combination, with the paddle-wheel projecting up through the slotted bottom of the box or hopper and adjustable hood, of an apron depending from the bottom of the box or hopper and partly beneath the paddle-wheel, substantially as described, and for the purpose set forth.

4. In a fertilizer-distributer, the paddle-wheel and adjustable guiding-apron hinged above the axis of the wheel and projecting partly thereunder, for regulating the direction of the flow of the fertilizer to the distributing-wheel, substantially as set forth.

5. In a fertilizer-distributer, in combination with an eccentric, the shaft of the feed-wheel, and connecting mechanism, the fertilizer-agitator I, substantially as described, and for the purpose set forth.

In testimony that I claim the foregoing I have hereunto set my hand, at Milwaukee, in the county of Milwaukee and State of Wisconsin, in the presence of two witnesses.

STEPHEN FREEMAN.

Witnesses:
S. S. STOUT,
H. J. FORSYTHE.